Aug. 18, 1953  F. M. McLAUGHLIN  2,649,191
AUTOMOBILE TOOL KIT
Filed March 19, 1951 2 Sheets-Sheet 1
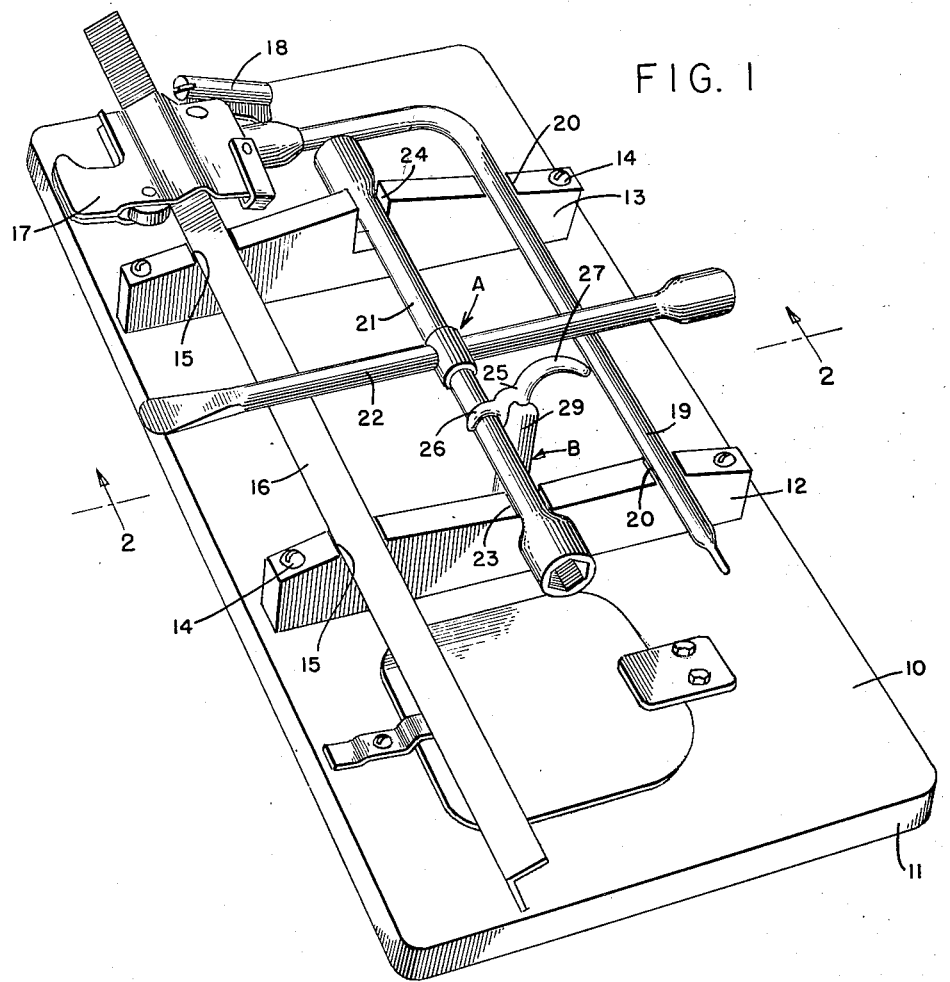
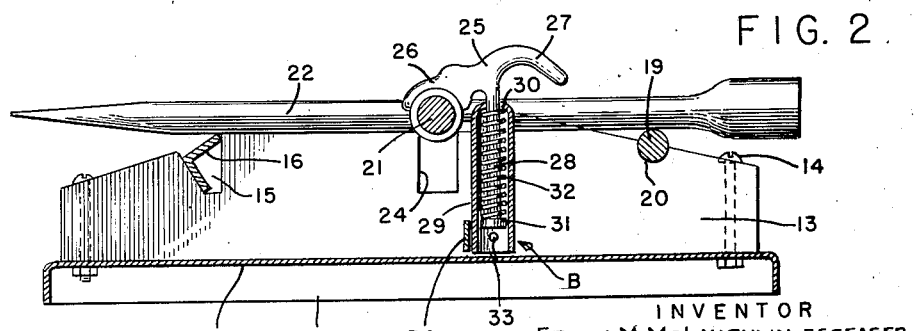
INVENTOR
FRANK M. McLAUGHLIN, DECEASED
BY FRANK H. McLAUGHLIN, ADMINISTRATOR
BY
Caswell & Lagand
ATTORNEYS

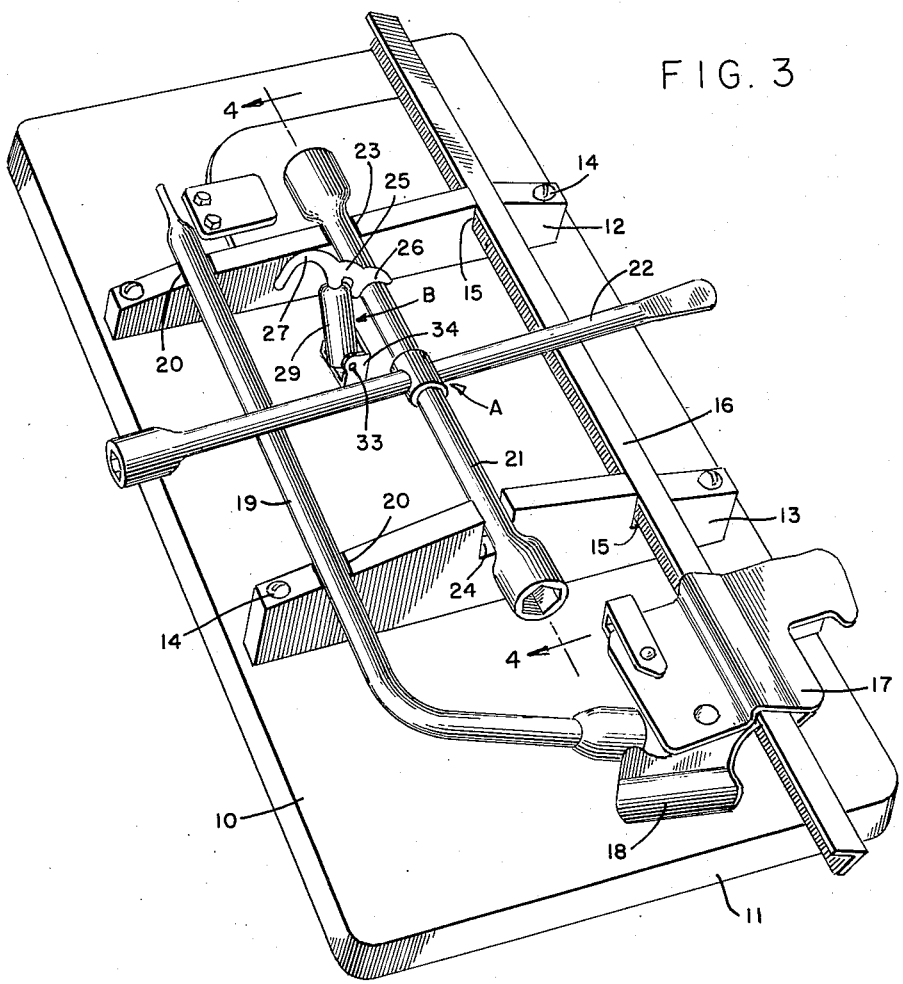
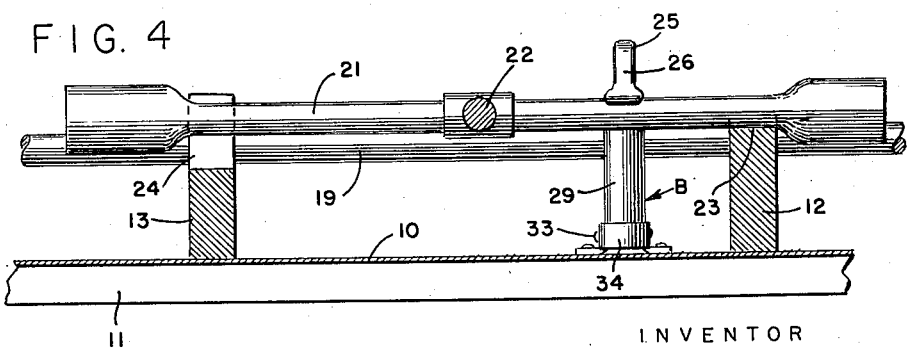

Patented Aug. 18, 1953

2,649,191

UNITED STATES PATENT OFFICE 2,649,191

AUTOMOBILE TOOL KIT

Frank M. McLaughlin, deceased, late of Hinckley, Minn., by Frank H. McLaughlin, administrator, Moorhead, Minn.

Application March 19, 1951, Serial No. 216,296

3 Claims. (Cl. 206—16)

This invention relates to improvements in tool kits and particularly kits for automobiles of the type adapted to accommodate an automobile hoisting jack and cross-wrench.

The conventional hoisting jack customarily carried in an automobile consists of a post with a lifting head thereon and a separable actuating handle for said head, while the conventional cross-wrench consists of a pair of shanks intersecting each other intermediately thereof in right angular relationship, each terminal of each shank being formed with a socketed wrench-head or other instrumentality.

It is an object of the present invention to provide a simple durable and inexpensive kit adapted readily to accommodate an automobile jack and cross-wrench and to hold the same compactly and rattle-free.

Another object of the invention is to provide a kit constructed for the accommodation of tools, as aforesaid, whereby said tools may be quickly and easily applied to and removed from the kit.

A further object of the invention is to provide a kit of the instant nature having a base member and a clamp member arranged to accommodate the kit's tools in a manner, whereby the cross-wrench is releasably clamped against parts of the jack and said parts, in turn, are releasably clamped against the base member of the kit.

A form of kit, constructed in embodiment of this invention, for the post and separable handle of a jack and for a cross-wrench, will include a base member having a pair of seats thereon for opposite end portions of said post and having another pair of seats thereon for opposite end portions of said handle, said seats being relatively arranged to locate the seat jack-post and jack-handle in spaced parallel relationship. An additional seat on the base member will provide a rest for one end portion of one shank of the cross-wrench with said cross-wrench disposed so as to locate said shank between the seated post and the seated handle of the jack and so as to bring the end portions of the other shank of the cross-wrench into position to override, respectively, the intermediate portions of said post and handle. On the base member will be a guide for the end portion of said first wrench-shank opposite said end portion thereof seated on said additional seat. This guide will allow its respective end portion of said first wrench-shank to move toward and from the base member and will deprive it of movement laterally of the base member toward the jack-post or toward the jack-handle. On the base member will be a clamp member adapted releasably to engage said first wrench-shank at a point between the seated end portion thereof and the intersection of the two wrench-shanks, such clamp member serving, through said first shank of the cross-wrench, to clamp said second shank thereof against the jack-post and jack-handle and in turn to clamp said jack-post and jack-handle against their respective seats on the base member.

In the drawings:

Fig. 1 is a perspective view of an automobile tool kit constructed in accordance with the present invention, the same being shown as holding in place thereon the post and separable handle of a hoisting jack and a cross-wrench of the type customarily used in connection with automobiles.

Fig. 2 is a transverse sectional view taken as on the line 2—2 of Fig. 1.

Fig. 3 is a view similar to Fig. 1, endwise reversed relative thereto.

Fig. 4 is a longitudinal sectional view taken as on the line 4—4 of Fig. 3.

Reference being had to the drawings, it will be seen that the illustrated embodiment of the present invention includes an elongated base panel 10 having a downturned marginal flange 11. A first mounting cleat 12 and a second mounting cleat 13 are fastened to the base-panel 10 by means of bolts 14, said cleats 12, 13 extending transversely of said base-panel 10 and being spaced apart as shown. At one side of the base-panel 10, the corresponding end portions of the mounting cleats 12, 13 are each formed with a notch 15 and these notches provide seats for opposite end portions of the post of an automobile hoisting jack of conventional form such as that shown in the drawing and designated by the reference numeral 16. In such well-known form of jack, a lifting-head 17, is slidably mounted on the post 16 and is provided with a socket member 18 for the reception of a separable handle 19. At the other side of said base-panel 10, the corresponding end portions of the mounting cleats 12, 13 are each formed with a notch 20 and these notches provide seats for opposite end portions of said jack-handle 19.

Along with the jack-post 16 and jack-handle 19, the present kit accommodates a cross-wrench, as at A, of familiar form having a first shank 21 and a second shank 22, said shanks intersecting each other intermediately thereof in right angular relationship.

The first mounting cleat 12 is formed intermediately thereof with a notch 23 which forms a seat for one end portion of the first shank 21 of the cross-wrench A in that disposition of said cross-wrench wherein its said first shank 21 lies between the seated jack-post 16 and the seated jack-handle 19 with second wrench-shank 22 overreaching at its opposite end portions the said seated jack-post and jack-handle.

The second mounting cleat 13 is formed intermediately thereof with an upwardly opening slot or guide 24 for the reception of the end portion of the first wrench-shank 21 opposite the end portion thereof seated on the seat 23 in said first mounting cleat 12. Said slot or guide 24 deprives its received end portion of the wrench-shank 21 of movement laterally of the base-panel 10 toward the jack-post 16 or toward the jack-handle 19, while allowing its said received end portion of said wrench-shank 21 to move toward the base-panel sufficiently to bring the one end portion of the second wrench-shank 22 to bear upon the jack-post 16 and the other end portion of said second wrench-shank 22 to bear upon the jack-handle 19.

A yielding clamp member B anchored to the base-panel 10 releasably secures the cross-wrench A in place and, through said cross-wrench A, secures the jack-post 16 and jack-handle 19 in their respective seated or cradled positions on the mounting cleats 12, 13. Said clamp member B includes a generally T-shaped clamping element 25, one branch of the bar thereof comprising a hook-like jaw 26 and the other branch of the said bar thereof comprising a hooked finger-piece 27. The leg of said clamping element 25 constitutes a stem 28 which is slidably received in a mounting-barrel 29. The upper end of the mounting barrel 29 is formed with an annular inwardly extending shoulder 30 and the lower end of the stem 28 of said clamping element 25 is provided with an annular outwardly extending shoulder 31. Within said barrel 29 and encircling said stem 28 is a helical expansion spring 32, the same being compressed between said shoulder 30 of the barrel 29 and said shoulder 31 of the stem 28. At its lower end, the barrel 29 is connected by means of pivot pintles 33 to a mounting clip 34 riveted or otherwise suitably fastened to the base-panel 10. Said clamp member B is located nearer to the first mounting cleat 12 than it is to the second mounting cleat 13 so that the jaw 26 of the clamping element 25 may overreach and catch upon the end portion of the first wrench-shank 21 at a position between said first mounting cleat 12 and the intersection of the shanks 21, 22, of the cross-wrench A. With the clamp member B thus located, one end portion of the first wrench-shank 21 is clamped down against its seat 23 on the first mounting cleat 12. At the same time, one end portion of the second wrench-shank 22 is clamped down against the seated jack-post 16 and the other end portion of said second wrench-shank 22 is clamped down against the seated jack-handle 19 with the result that said cross-wrench A, jack-post 16 and jack-handle 19 are securely held, entirely rattle-free, in the kit structure while being rendered quickly available for their respective uses by a simple pull upon the finger-piece 27 of the clamping element 25, against the action of the spring 32, followed by a twist of said clamping element 25 to free it from the shank 21 of said cross-wrench A.

From the foregoing, it will be readily understood that the said jack members and cross-wrench may be quickly and easily applied to and removed from the kit and that said parts, when applied to the kit, will be firmly held in their respective positions free from rattling against each other or against the kit structure. The kit is readily accommodated in the trunk compartment of the ordinary automobile so as to be conveniently accessible in case of need for the tools carried thereby. Kit and tools together constituting a single package, the tools will not be inaccessibly scattered about the trunk compartment and intermingled with the contents thereof to cause damage thereto and to set up rattling noises.

Having described the invention, what is claimed as new and desired to be protected by Letters Patent is:

1. In an automobile tool kit, a base, a lifting jack including a post and a separable handle, and a cross-wrench having two shanks intersecting each other intermediately thereof in right angular relationship, said base comprising a base-panel, a first mounting cleat on said base-panel and a second mounting cleat thereon parallel with and spaced from said first cleat, said cleats having correspondingly in each thereof a first notch near one of its ends and a second notch near the other of its ends, said first notches of said cleats providing seats for opposite end portions of the post of said lifting jack, said second notches of said cleats providing seats for opposite end portions of the handle of said lifting jack, said first cleat having therein a notch intermediately thereof providing a seat for one end portion of one shank of said cross-wrench, said second cleat having therein a slot intermediately thereof adapted to receive and guide the other end portion of said cross-wrench shank for movement thereof toward said base-panel to bring the opposite end portions of the second shank of said cross-wrench to bear, respectively, upon intermediate portions of the seated post and handle of said lifting jack, and a clamp member on the base-panel releasably engaging the first mentioned shank of said cross-wrench between the intersection of the two cross-wrench shanks and said first cleat, said clamp clamping the first mentioned shank of said cross-wrench against its seat on said first cleat and also clamping the second mentioned shank of said cross-wrench against the seated post and handle of said lifting jack, in turn clamping said seated post and handle of said lifting jack against their respective seats on said mounting cleats.

2. In an automobile tool kit, a base, a lifting jack including a post and a separable handle, and a cross-wrench having a first shank and a second shank intersecting each other intermediately thereof in right angular relationship, said base comprising a base-panel, a pair of seats on the base-panel at one marginal portion thereof providing rests for opposite end portions of said jack-post, another pair of seats on said base-panel at the marginal portion thereof opposite its said first marginal portion providing rests for opposite end portions of said jack-handle, an additional seat on the base-panel providing a rest for one end portion of said first shank of said cross-wrench with said cross-wrench disposed to locate its said first shank between the seated jack-post and jack-handle and to bring the opposite end portions of said second shank of said cross-wrench to bear, respectively, upon intermediate portions of the seated jack-post and jack-handle, and a clamp member on the base-panel releasably engaging said first shank of said cross-wrench clamping the same against its said seat and also clamping said second shank of said cross-wrench against said jack-post and jack-handle, in turn clamping said jack-post and jack-handle against their respective seats.

3. In an automobile tool kit, a base, a lifting jack including a post and a separable handle, and a cross-wrench having a first shank and a second shank intersecting each other intermediately thereof in right angular relationship, said base comprising a base-panel, a pair of seats on the base-panel for opposite end portions of said jack-post, another pair of seats on said base-panel for opposite end portions of said jack-handle, said pairs of seats being relatively arranged to locate the seated jack-post and jack-handle in substantially parallel relationship spaced apart a distance less than the length of said second shank of said cross-wrench enabling said cross-wrench to be positioned with its said first shank between the jack-post and jack-handle of said lifting jack and with the opposite end portions of said second shank of said cross-wrench resting, respectively, upon intermediate portions of said jack-post and jack-handle, and clamp means on the base-panel releasably engaging said first shank of said cross-wrench holding it relative to the base-panel and clamping it against said jack-post and jack-handle, in turn clamping said jack-post and jack-handle against their respective seats.

FRANK H. McLAUGHLIN,
*Administrator of the estate of Frank M. Mc-Laughlin, deceased.*

References Cited in the file of this patent

UNITED STATES PATENTS

| Number | Name | Date |
|---|---|---|
| 190,121 | Budd | May 1, 1877 |
| 1,239,023 | McElhinny | Sept. 4, 1917 |
| 1,538,621 | Chase | May 19, 1925 |
| 2,270,563 | Schnebelen | Jan. 20, 1942 |
| 2,554,680 | Morris et al. | May 29, 1951 |

FOREIGN PATENTS

| Number | Country | Date |
|---|---|---|
| 4,635 | Great Britain | Feb. 23, 1914 |
| 665,284 | Germany | Sept. 1, 1938 |